US010515330B2

(12) United States Patent
Soman et al.

(10) Patent No.: US 10,515,330 B2
(45) Date of Patent: Dec. 24, 2019

(54) REAL TIME VISIBILITY OF PROCESS LIFECYCLE

(71) Applicant: Tata Consultancy Services Limited, Mumbai (IN)

(72) Inventors: Manoj Digambar Soman, Mumbai (IN); Mahesh Kshirsagar, Mumbai (IN); Naresh Balasubramanian, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 586 days.

(21) Appl. No.: 15/068,219

(22) Filed: Mar. 11, 2016

(65) Prior Publication Data
US 2017/0161666 A1   Jun. 8, 2017

(30) Foreign Application Priority Data

Dec. 4, 2015   (IN) .......................... 4596/MUM/2015

(51) Int. Cl.
*G06Q 10/06*   (2012.01)
(52) U.S. Cl.
CPC ... *G06Q 10/06393* (2013.01); *G06Q 10/0633* (2013.01)
(58) Field of Classification Search
CPC ......................................... G06Q 10/00–50/00
USPC ............................................. 705/7.11–7.42
See application file for complete search history.

(56) References Cited

U.S. PATENT DOCUMENTS

| 7,124,101 B1* | 10/2006 | Mikurak | G06Q 10/06 705/35 |
| 7,506,001 B2* | 3/2009 | Johnson | G06Q 10/06 705/37 |
| 7,716,592 B2* | 5/2010 | Tien | G06Q 40/00 715/744 |

(Continued)

FOREIGN PATENT DOCUMENTS

WO   WO 2011/149443 A1   12/2011

OTHER PUBLICATIONS

Korotina, Anastasiia, Oliver Müller, and Stefan Debortoli. "Real-time Business Process Intelligence. Comparison of different architectural approaches using the example of the order-to-cash process." Wirtschaftsinformatik. 2015. (Year: 2015).*

(Continued)

*Primary Examiner* — Alan S Miller
(74) *Attorney, Agent, or Firm* — Finnegan, Henderson, Farabow, Garrett & Dunner LLP

(57) ABSTRACT

A system and a method for process transaction visibility of one or more steps in a process lifecycle. The method includes identifying a current status of one or more process transactions at a first step of a process lifecycle and determining a change in the status of the one or more process transactions at the first step based the complete of a milestone of the one or more process transaction at the first step. A one or more Key Performance Indicators (KPIs) information is calculated for the current status and the changed status of the one or more process transactions to generate a KPIs report. A unified view of the current status and changed status of the one or more process transactions is displayed on a digital dashboard.

16 Claims, 5 Drawing Sheets

(56) References Cited

U.S. PATENT DOCUMENTS

| | | | |
|---|---|---|---|
| 7,774,742 B2* | 8/2010 | Gupta | G06Q 10/06 717/100 |
| 7,899,679 B2* | 3/2011 | MacKay | G06Q 10/06 705/7.27 |
| 7,921,024 B2* | 4/2011 | Hogan | G06Q 10/06 705/7.22 |
| 7,996,441 B2* | 8/2011 | Johnson | G06Q 10/06 705/1.1 |
| 8,504,405 B2* | 8/2013 | Miller | G06Q 10/06 705/7.23 |
| 8,769,484 B2* | 7/2014 | Arsanjani | G06Q 10/06 717/104 |
| 8,805,716 B2 | 8/2014 | Michel et al. | |
| 8,805,718 B2* | 8/2014 | Haywood | G06Q 40/08 705/4 |
| 8,843,939 B2* | 9/2014 | Lesandro | G06Q 10/06 705/39 |
| 8,949,104 B2* | 2/2015 | Jeng | G06Q 10/0639 703/22 |
| 8,996,397 B2* | 3/2015 | Grace | G06Q 10/063114 705/7.28 |
| 9,230,224 B2* | 1/2016 | Ramsey | G06Q 10/06 |
| 2003/0033191 A1* | 2/2003 | Davies | G06Q 10/06 705/7.14 |
| 2005/0010456 A1* | 1/2005 | Chang | G06Q 10/063 705/7.38 |
| 2005/0114829 A1* | 5/2005 | Robin | G06Q 10/06 717/101 |
| 2005/0229151 A1* | 10/2005 | Gupta | G06Q 10/06 717/101 |
| 2006/0224400 A1* | 10/2006 | Chkodrov | G06Q 10/00 705/1.1 |
| 2007/0038492 A1* | 2/2007 | Ryan | G06F 8/10 705/7.26 |
| 2007/0055564 A1* | 3/2007 | Fourman | G06Q 10/06393 705/7.39 |
| 2007/0208606 A1* | 9/2007 | MacKay | G06Q 10/06 705/7.15 |
| 2008/0016490 A1* | 1/2008 | Pabalate | G06Q 10/10 717/101 |
| 2008/0040140 A1* | 2/2008 | Aleong | G06Q 10/06 705/7.39 |
| 2008/0114628 A1* | 5/2008 | Johnson | G06Q 10/06 707/792 |
| 2008/0126163 A1* | 5/2008 | Hogan | G06Q 10/06 705/7.25 |
| 2009/0064322 A1* | 3/2009 | Finlayson | G06F 21/6218 726/21 |
| 2009/0070698 A1* | 3/2009 | Shurtleff | G06Q 10/06 715/772 |
| 2009/0192842 A1* | 7/2009 | Grabarnik | G06Q 10/06 705/7.27 |
| 2010/0185474 A1* | 7/2010 | Frank | G06Q 10/06 705/7.15 |
| 2010/0274596 A1* | 10/2010 | Grace | G06Q 10/063114 705/7.15 |
| 2010/0275054 A1* | 10/2010 | Grace | G06Q 10/10 714/2 |
| 2011/0004627 A1* | 1/2011 | Reca | G06Q 10/06 707/778 |
| 2011/0219354 A1* | 9/2011 | Zhang | G06Q 10/06 717/104 |
| 2011/0283224 A1* | 11/2011 | Ramsey | G06F 3/04855 715/781 |
| 2012/0054095 A1* | 3/2012 | Lesandro | G06Q 20/10 705/39 |
| 2012/0066030 A1* | 3/2012 | Limpert | G06Q 10/0639 705/7.38 |
| 2012/0180071 A1* | 7/2012 | Lesandro | G06Q 10/06 719/313 |
| 2012/0185301 A1* | 7/2012 | V.K. | G06Q 10/063 705/7.39 |
| 2012/0215585 A1* | 8/2012 | Loveday | G06Q 40/02 705/7.29 |
| 2012/0264036 A1 | 11/2012 | Evans | |
| 2012/0284036 A1* | 11/2012 | Evans | G06Q 30/0201 705/1.1 |
| 2013/0132108 A1* | 5/2013 | Solilov | G06Q 10/06 705/2 |
| 2013/0138601 A1* | 5/2013 | Mahalanabis | G06F 17/30563 707/602 |
| 2013/0179231 A1* | 7/2013 | Bou-Ghannam | G06Q 10/10 705/7.38 |
| 2014/0244362 A1* | 8/2014 | Chaudhury | G06Q 10/06375 705/7.37 |
| 2014/0365266 A1* | 12/2014 | Sethi | G06Q 10/0633 705/7.27 |
| 2015/0005609 A1* | 1/2015 | Evans | A61B 5/0006 600/384 |
| 2015/0005809 A1 | 1/2015 | Ayres et al. | |
| 2015/0012324 A1* | 1/2015 | Lance | G06Q 10/06313 705/7.23 |
| 2015/0134593 A1* | 5/2015 | Ramesh | G06Q 10/0637 707/602 |
| 2015/0278751 A1* | 10/2015 | Sunder | G06Q 10/063114 705/7.15 |
| 2017/0053224 A1* | 2/2017 | Duca | G06Q 10/06393 |
| 2017/0054816 A1* | 2/2017 | Brummet | H04L 67/142 |

OTHER PUBLICATIONS

Heidrich, Jens, Jürgen Münch, and Axel Wickenkamp. "Usage Scenarios for Measurement-based Project Control." Proceedings of the 3rd Software Measurement European Forum (SMEF 2006),(Ton Dekkers, Ed.). 2006. (Year: 2006).*

Staron, Miroslaw, Kent Niesel, and Wilhelm Meding. "Selecting the right visualization of indicators and measures—dashboard selection model." Software Measurement. Springer, Cham, 2015. 130-143 (Year: 2015).*

Kolár, Jirí. "Business activity monitoring." Unpublished Master Thesis. Masaryk University (2009). (Year: 2009).*

* cited by examiner

| Order ID | Custo-mer Name | Oder Built | Product | Customer Contact | Infra Install-1 Day | Install Day | Infra Install+ 1Day | Service Install-1Day | Service Day | Service Install +1Day |
|---|---|---|---|---|---|---|---|---|---|---|
| ABC | JKL | date time time - taken ● | date time time - taken ○ | date time time -taken ○ | date time time -taken ○ | date time time - taken ○ | date time time - taken ○ | date time time - taken ● | date time time – taken Scheduled date ● | ○ |
| DEF | MNO | date time time - taken ● | ○ | ○ | Scheduled date ○ | date time time - taken ● | ○ | ○ | Scheduled date ○ | ○ |

402

FIG. 4 though the embodiments herein are not limited thereto. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

REAL TIME VISIBILITY OF PROCESS LIFECYCLE

CROSS-REFERENCE TO RELATED APPLICATIONS AND PRIORITY

The present application claims priority to Indian Provisional Patent Application No. 4596/MUM/2015, filed on Dec. 4, 2015 the entirely of which is hereby incorporated by reference.

TECHNICAL FIELD

The present subject matter relates, in general, to process operation visibility; and, in particular, to providing system and method for process transaction visibility in real-time.

BACKGROUND

Typically, in a transaction such as processing orders, cases, issues, requests and queries in a process operation business context requires combination of multiple system-to-system and/or human-to-system interactions and follows lifecycle of multiple milestones, states from start to end. Such a complex combination of interactions leads to challenges in measuring and tracking efficiency and effectiveness of the process. Data exploration is challenging task because of the issue of having to deal with multiple inter-related parameters. Cognitive load resulting from complex inter-relationships between parameters can hinder insight generation. A structured multidimensional representations for such data helps to generate insights about the complex and dynamic relationships between parameters. Such exploratory tasks may also be aided by visualizations of these multidimensional representations so as to allow users to reason through heterogeneous, complex, and often incomplete datasets.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method for process transaction visibility of one or more steps in a process lifecycle. In one aspect, a computer-implemented system includes at least one memory; and at least one processor, the at least one memory coupled to the at least one processor wherein the at least one processor is capable of executing programmed instructions stored in the at least one memory to identify a current status of one or more process transactions at a first step of a process lifecycle based on a unique ID tagged to the process transaction at the first step; determine a change in the status of the one or more process transactions at the first step based a completion of a milestone of the one or more process transaction and progression of the one or more process transactions to a second step of the process lifecycle, wherein the second step is identified by mapping the current status of the one or more process transaction at the first step to corresponding process attributes at a predefined condition; calculate one or more Key Performance Indicators (KPIs) information for the current status and the changed status of the one or more process transactions to generate a KPIs report; and display an unified view of the current status and changed status of the one or more process transactions on a digital dashboard, the digital dashboard is in communication with the at least one processor, and wherein the digital dashboard further displays a traceability report generated based on a milestone completed by the one or more process transactions at the first step of the process lifecycle and the generated KPIs report.

In another aspect, computer-implemented method executed by a computing device for providing the process transaction visibility of one or more steps in a process lifecycle. The method includes identifying a current status of one or more process transaction at a first step of a process lifecycle based on a unique ID tagged to each of a process transaction at the first step; determining a change in the status of the process transaction at the first step based a completion of a milestone of the one or more process transactions and progression of the one or more process transaction to a second step of the process lifecycle, wherein the second step is identified by mapping the current status of the one or more process transactions at the first step to corresponding process attributes at a predefined condition; calculating one or more Key Performance Indicators (KPIs) information for the current status and the changed status of the one or more process transactions to generate a KPIs report; and display an unified view of the current status and changed status of the one or more process transactions on a digital dashboard, the digital dashboard is in communication with the at least one processor, and wherein the digital dashboard further displays a traceability report generated based on a milestone completed by the one or more process transactions at the first step of the process lifecycle and the generated KPIs report.

BRIEF DESCRIPTION OF THE FIGURES

The embodiments herein will be better understood from the following detailed description with reference to the drawings, in which:

FIG. 4 is graphical representation of a tracking view illustrating working of system of FIG. 2, respectively, in accordance with an example embodiment;

DETAILED DESCRIPTION

Figure 1:
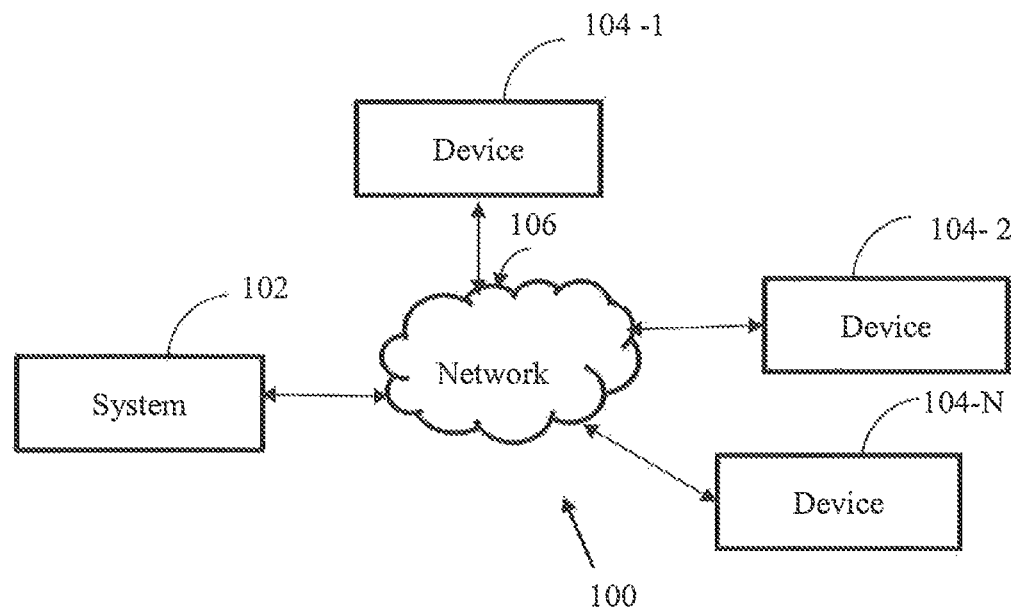
FIG. 1 illustrates a diagram of an example environment in which systems and/or methods, described herein, may be implemented, in accordance with an example embodiments.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 illustrates an exemplary diagram of an environment 100 implementing a process lifecycle representation system 102 for providing the process transaction visibility of one or more steps in a process lifecycle, in accordance with example embodiments. The process lifecycle representation system 102 may hereinafter be referred to as a system 102. The system 102 may be implemented in a variety of computing systems such as a laptop computer, a desktop computer, a notebook, a workstation, a mainframe computer, a server, a network server, and the like. It will be understood that the system 102 may be accessed through one or more devices, for example electronic devices 104-1, 104-2, 104-3, and 104-N, that may be collectively referred to as electronic devices 104. Examples of the electronic devices 104 may include, but are not limited to, a portable computer, a personal digital assistant, a handheld device, and a workstation. The electronic devices 104 are communicatively coupled to the system 102 through a network 106 for facilitating one or more users to access the system 102. In an embodiment, the electronic device 104-1 belongs to a user, and may facilitate a user in accessing information from the system 102. Likewise, the electronic devices 1041-N may belong to a plurality of users.

In various embodiments, the transaction being processed in an industry from a start to an end constitutes a process lifecycle t, for example, a telecom industry, flows through a system from amongst a plurality of systems, for example, system 102, and a plurality of users, namely, creators, verifiers, assessors and the like. The system 102 may be accessed by one or more users through one or more devices, for example electronic devices 104-1, 104-2, 104-3, and 104-N, that may be collectively referred to as electronic devices 104. The plurality of system and the plurality of users follows at least one or more milestones or status of a project lifecycle, from start to end.

The system 102, for example is a system architecture with server-side management to store and maintain user interactions on the electronic devices 104, and exploration activities from a plurality of users connected via a network 106. The electronic devices 104 are configured to capture information such as user interaction with the system 102, with other users and results of these interactions is used to update transaction in a process lifecycle. Further, the system 102, is descripted in detailed with respect to FIG. 2.

In one implementation, the network 106 may be a wireless network, a wired network or a combination thereof. The network 106 can be implemented as one of the different types of networks, such as intranet, local area network (LAN), wide area network (WAN), the internet, and the like, or any combination thereof used for transferring information between the electronic devices 104 and system 102. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
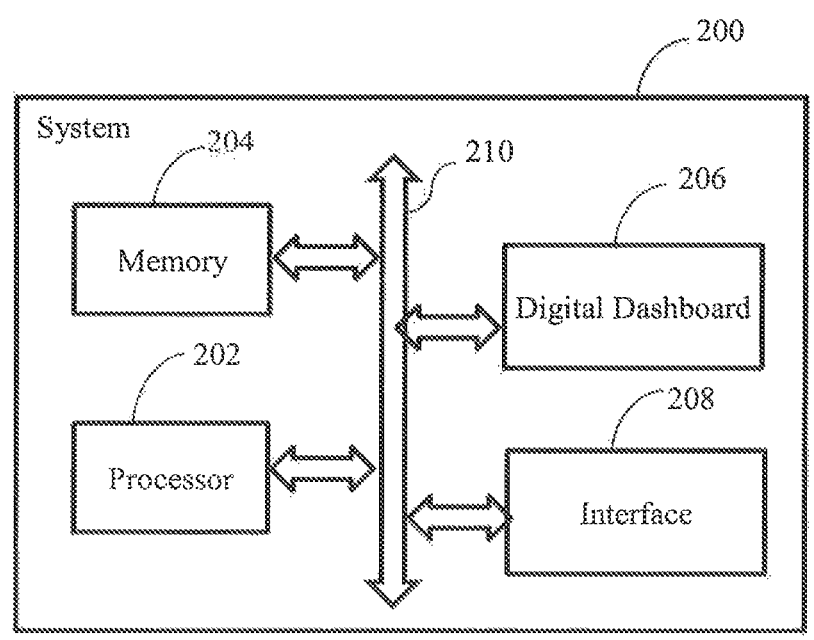
FIG. 2 is a block diagram of a system of FIG. 1, in accordance with an example embodiment.

FIG. 2 is a block diagram of a system 200, for processing at least one transaction at each step in a process lifecycle, for example, the system 102 of FIG. 1, in accordance with an example embodiment. The system 200 includes or is otherwise in communication with at least one processor such as a processor 202, at least one memory such as a memory 204, and an interface 208. The processor 202, the memory 204, the digital dashboard 206 and the interface 208 may be coupled by a system bus such as a system bus 210 or a similar mechanism. Although FIG. 2 shows example components of system 200, in other implementations, system 200 may contain fewer components, additional components, different components, or differently arranged components than depicted in FIG. 2.

The system 200 helps to enable measuring and tracking efficiency and effectiveness of processes, as displayed on the digital dashboard 206 including a complete visibility of transaction processing and progress of the milestones associated with one or more steps with a right-time view (as per an industry requirement). The complete visibility of the at least one transaction at each step is further described in detail in FIGS. 3-6. The dashboard view of the system 200 provides an immediate right-time visibility into complete life-cycle of a process to see how many transactions are being processed currently viz-a-viz how many are holding respective transaction and the milestone associated to such transaction. The system 200 further facilitates finding the cause for the delay/failure and taking corrective actions. The dash board view is a near real-time view web applications including an auto refresh page view at scheduled frequency/vent with minimum time latency. This auto refresh page view is achieved by a server pushing information to web page view at scheduled frequency.

In an embodiment, the digital dashboard 206 depicts the traceability view showing all the process transactions being processed by the system 200 in real-time. In an example embodiment, the transactions includes all milestones across the process lifecycle. The milestones for one or more step are primarily associated with three attributes, namely, date and time at which a milestone was achieved, time taken for completing the milestone, a visual indicator showing whether the milestone achieved is completed within the defined Service Level Agreement (SLA). The process attributes depicted graphically with process instance counts superimposed on the respective milestones in process flow image. For example, process instance counts may include process transaction completed outside the defined SLA. The process information is extracted from a process model xml file and pixel-perfect image is drawn and depicted on the digital dashboard 206. In an embodiment, the system 200 is also configured to allow users to drop a BPMN compatible xml file extracted from process model to designated directory based on a Hot-pluggable process flows feature. The system promptly reads process xml to create process image and create a dashboard programmatically at runtime with no manual efforts involved for configuration and coding.

In an example embodiment, an analytical engine (not shown in the FIGS) may be embedded within the system 200. The analytical engine may be included to predict the flow of the at least one transaction at each step of the process at runtime, based on the process state defined in the process flow. In an alternative embodiment, when a process is pre-configured, the analytical engine evaluates a current status of a process transaction and corresponding process attributes to decide on which new process workflow branches to fork out. In another alternative embodiment, the analytical engine also calculates the corresponding process attributes in real-time and as and when the predefined conditions are satisfied. Based on the current state of the at least one process transaction, the analytic engine directs a process workflow engine to spawn respective branch of the process workflow as well as re-draw workflow image to extend the workflow image to include respective new spawned branch of process workflow.

The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The at least one memory such as a memory 204, may store any number of pieces of information, and data, used by the system to implement the functions of the system. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 202 causes the system 200 to behave in a manner as described in various embodiments.

The interface 208 may include an input interface and an output interface. The output interface may include an output device such as a display, a ringer, an earphone or speaker, a microphone, and an input interface. The input interface is configured to receive an indication of a user input. Examples of the input interface may include, but are not limited to, a keyboard, a mouse, a joystick, a keypad, a touch screen, soft keys, and the like. The output interface provides a visual, mechanical, audible or other output and/or feedback to the user. The user interface 210 may be in communication with the processor 202. In this regard, for example, the processor 202 may comprise user interface circuitry configured to control at least some functions of one or more elements of the interface 208. The processor 202 and/or user interface circuitry comprising the processor 202 may be configured to control one or more functions of one or more elements of the interface 208 through computer program instructions, for example, software and/or firmware, stored on a memory, for example, the memory 204, and/or the like, accessible to the processor 202. In an example embodiment, the processor 202 along with the memory 204 and other components of the system 200 may be configured to receive a process flow from an electronic device 104 (FIG. 1) at the system 200.

In an example embodiment, the digital dashboard 210 is configured to display a complete visibility of process lifecycle showing a process transaction and completed milestones of one or more steps in a process lifecycle. The digital dashboard 210 is further configured to give a complete and comprehensive visibility of the current process transaction being processed by overlaying on top of process maps. One or more functionalities of the system 200 and components thereof, is further explained in detail with respect to FIGS. 3-6.

For example, in a process transaction such as processing orders, cases, issues, requests and queries in an industry context includes combination of multiple system-to-system and/or human-to-system interactions and follows lifecycle of one or more milestones, that is, status of the transaction from start to end (until it reaches the milestone). In an example embodiment, such information relevant to the process transaction is sourced from a plurality of IT applications in multiple ways.

In one embodiment, sourcing information application includes (a) sourcing information using frontend integration and (b) sourcing information using backend integration. The sourced information may be called on by the system 200 for further processing. Sourcing information includes receiving specific data, for example, data like process attributes, process parameters, and variables. In an example, data may be sourced from a database, a file system, a ERP system, a web service. In an example embodiment, the system 200 is an event based system. The system 200 waits for an event to occur and calls for the information (as in input).

In one embodiment the relevant information is sourced using frontend integration. Herein, the relevant information is sourced using mimicking a user actions (on a user device 104) and parsing a HTML source of web pages in an application. In the frontend integration, no changes in the IT systems or exposing any interfaces is required. Data related to at least one process transaction is sourced/extracted from frontend (UI). In the frontend integration, only relevant information is extracted. In another embodiment, the relevant information is sourced using backend integration. Herein, the relevant information is sourced by connecting to backend data sources by one or more conventional techniques, ensuring that such a data access involves minimal load on normal processing. In one implementation, relevant information may be sourced in the form of a Web Service such that the relevant information is fed into the system 200 using one or more methods provided by the system 200. The one or more methods provide seamless backend connectivity and reliability.

Figure 3:
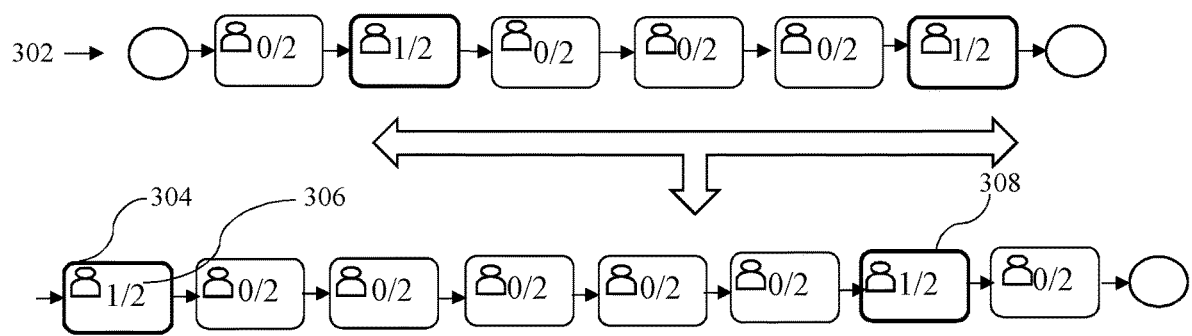
FIG. 3 is graphical representation of a dashboard view illustrating working of system of FIG. 2, in accordance with an example embodiment.

FIG. 3 is a graphical representation illustrating functional flow in the system 200 of FIG. 2 for process transaction visibility of one or more steps in a process lifecycle, in accordance with an example embodiment. Referring now to FIG. 3, the complete process flow in a lifecycle is shown across 302. The process flow at 302 is a diagrammatic representation of a plurality of steps in the process including one or more process transactions. The plurality of steps across process flow 302 is queued up, for example, at first step 304 is highlighted to indicate the current step being processed, from amongst the plurality of steps. For the one or more process transactions 306, at first step 304, a current status is identified. The current status of the one or more process transactions at the first step 304 may be identified by the unique ID tagged to the each of the process transaction at the first step 304. Each of the process transaction is associated with a corresponding unique ID. In an implementation, the unique ID is assigned based in the predefined steps of the process lifecycle. The first step 304 is currently waiting for all the process transactions to be completed. Once the milestone associated with the one or more process transactions 306 is completed, the change in status occurs. In an event of completion of the milestone, the one or more process transaction moves to the second step.

The change in the process transaction at the first step is determined based on a completion of the milestone by one or more process transaction at first step and its migration to a second step of the process lifecycle. The second step 308 is identified by mapping the current status of the one or more process transactions at the first step to the corresponding process attributes of the process transaction for a predefined condition. In an example embodiment, the process attributes may include variables defined based on a condition in the process work flow for selecting a particular flow. For such particular flow the variables are evaluated. For example, in a banking industry, in a process work flow of obtaining a credit card, condition is such that the net worth of the individual should be more than ten thousand and the process attributes defined are Name, Net Worth, Age. Hence for a credit card approval flow, the process attribute that need to be evaluated is Net Worth, which is specified using a condition in the work flow.

FIG. 4 is a graphical representation of the tracking view illustrating functional flow in the system 200 of FIG. 2 The tracking view includes tracking the history of the process transactions through various phases and at each step. For each milestone, primarily, three attributes are as shown at 402, such as and not limited to (a) date and time at which milestone was achieved (b) time taken for completing corresponding milestone (c) a visual indicator showing whether milestone is completed within specified SLA (Service Level Agreement). Similarly, the set of attributes are shown for current milestone which are being served for transaction. In an example embodiment, the visual indicator can be configured according to SLA timelines of the process transaction and changed, for example, to green, yellow and red as per the status. In an example embodiment green indicates the process traction completed within the SLA timelines, yellow indicates process transaction in progress within the SLA timelines and red indicates a process transaction which is exceeds the SLA timelines.

In an example embodiment, a calculation engine (not shown in the FIGS) may be used to calculate (Key Performance Indicators) one or more KPIs information corresponding to the change in the status of the process transaction and/or process attributes (in near real-time) and generate a KPIs report. The calculation engine may be embedded within the system 200. The calculated KPIs information may be overlaid in a process map on the digital dashboard 201 for a unified view of the one or more process transaction of the plurality of process step in a process lifecycle.

Figure 5A:
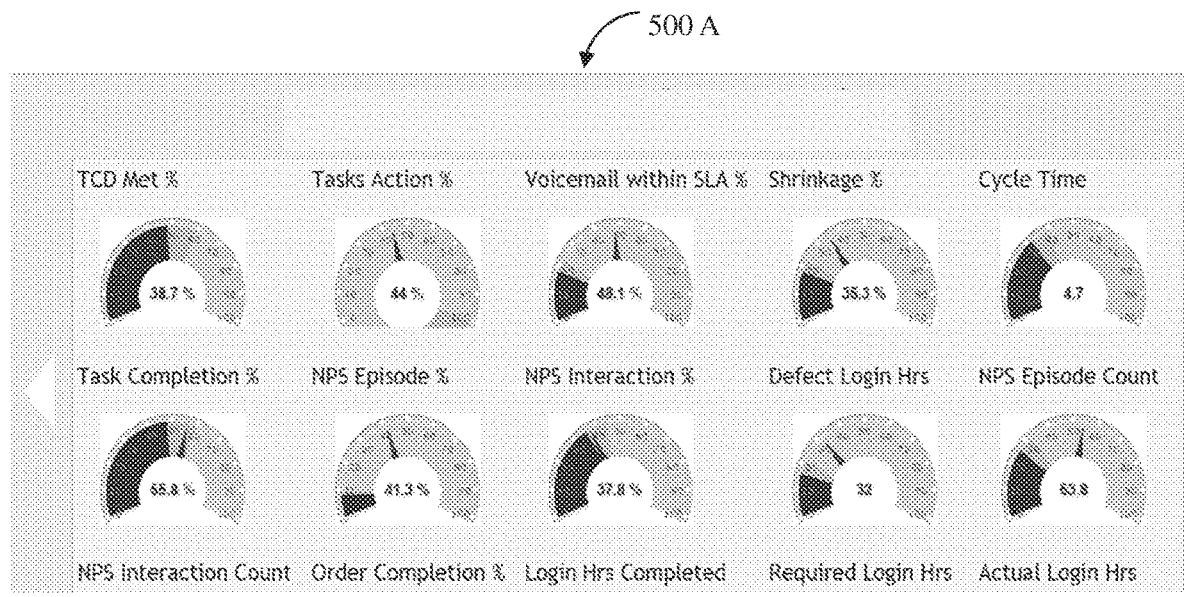
FIGS. 5A and 5B are graphical representations of KPIs view illustrating working of system of FIG. 2, in accordance with an example embodiment.
Figure 5B:
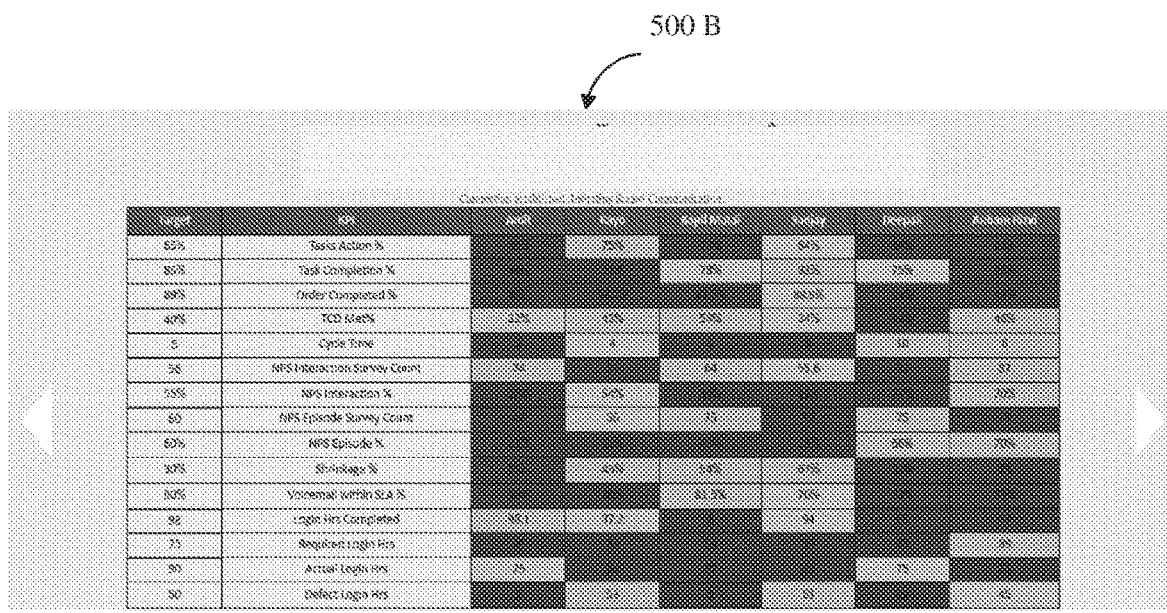

FIGS. 5A and 5B are graphical representation of KPIs views illustrating functional flow in the system 200 of FIG. The business tracking view of FIG. 5A provides a granular level information such as a right-time tracking view for the process transactions being processed to track adherence to specific SLAs, to address the problems or issues at an early stage in a process workflow by getting right-time updates from ongoing transactions in real-time. Referring now to FIG. 5B, is an aggregated view of the KPIs report showing the measure of a success rate, an un-successful transaction and the like. This helps in addressing the issue on the un-successful transaction and levering on the success rate.

The digital dashboard 210 provides an immediate right-time visibility to the complete life-cycle of the process lifecycle, the one or more process transactions being at various status, for example, transaction is being processed currently viz-a-viz how many are holding respective transaction to achieve the milestone. The digital dashboard displays a unified view of the current status and changed status of the process transaction on a digital dashboard (As shown in FIG. 3). The unified view comprises a traceability report generated based on a milestone completed by the process transaction at the first step of the process lifecycle and the KPIs report based on the one or more KPIs information.

The system 200, is further configured to generate notifications, for example via email or text message, for the competition of the milestone of the process transaction at scheduled frequency. The notifications helps in getting near real-time view for web applications and to have auto refresh page view at scheduled frequency with minimum time latency involved in page refresh. For example, server pushing information to web page view at scheduled frequency.

Figure 6:
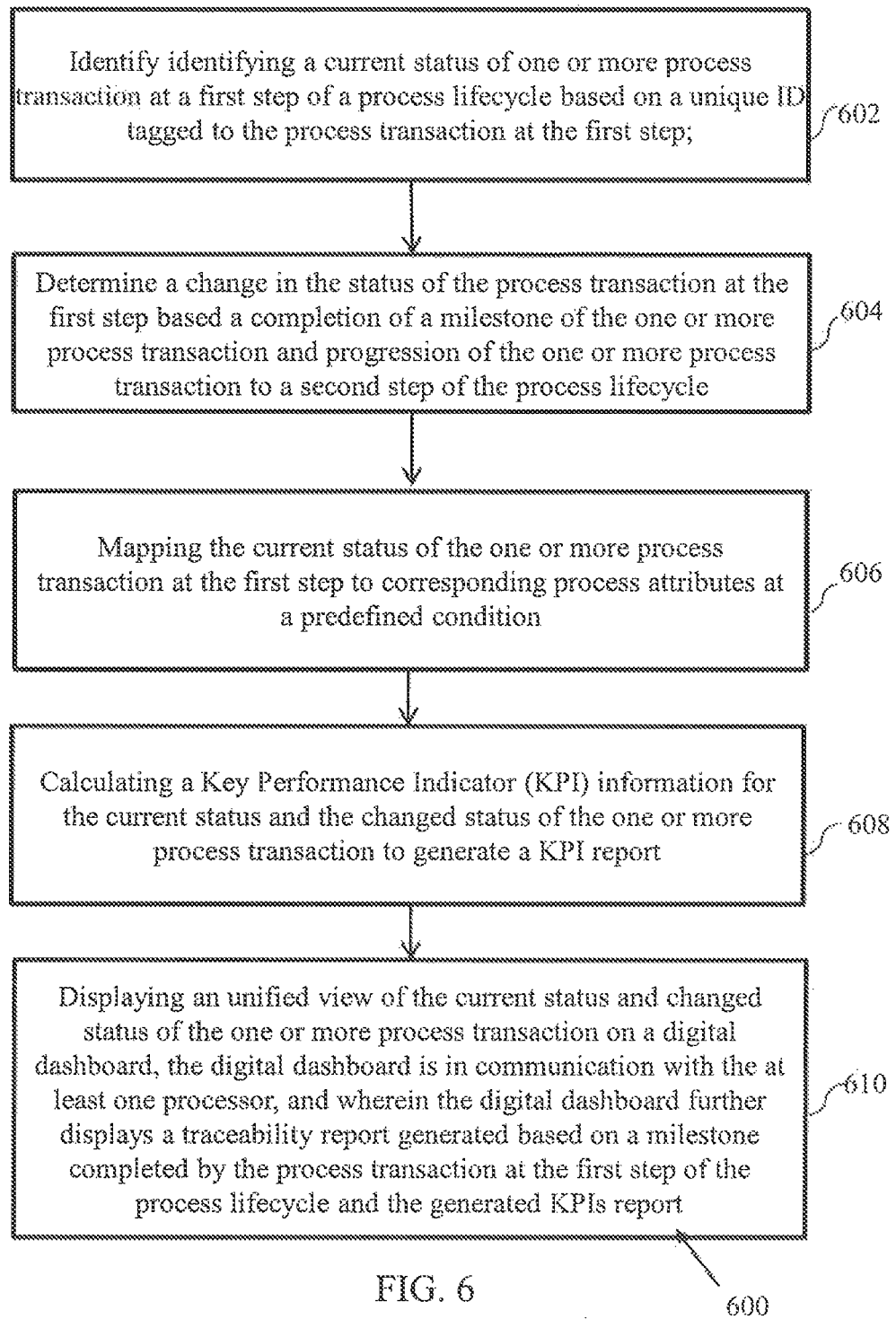
FIG. 6 illustrates a flow chart 600 for processing at least one transaction at each step in a process lifecycle, in accordance with an example embodiment.

FIG. 6 illustrates a flow diagram of a method 600 for processing at least one transaction in a process lifecycle, in accordance with the present disclosure. At block 602, a current status of one or more process transaction of a first step of a process lifecycle is identified based on a unique ID tagged to the process transaction. In an example embodiment, the current process in a transaction is identified based on the information sourced in real-time or unique ID corresponding to a process transaction stored in a data repository. At block 604, a change in the status of the process transaction is determined based on completion of a milestone of one or more process transaction. The current transaction being processed is overlaid on top of process maps to give a complete and comprehensive visibility of the current happenings of the process at each step (As shown in FIG. 4) At block 606, second step of the process lifecycle, wherein the second step is identified by mapping the current status of the one or more process transaction at the first step to corresponding process attributes at a predefined condition. The predefined conditions are identified based on the process attributes associated with a particular process transaction. The process attributes are the variables defined in the process flow as per a business requirement.

At block 608, one or more Key Performance Indicators (KPIs) information for the current status and the changed status of the one or more process transaction to generate a KPIs report. A KPIs report is generated based on the calculated one or more KPIs information. The one or more KPIs information is calculated as and when there is a change in the process transaction and/or process attributes. The KPIs report is generated each time a change in process transaction occurs and displayed on the digital dashboard (As shown in FIG. 5A 7 5B). In an example embodiment, the one or more KPIs information is calculated based on the process attributes and predefined conditions (custom configurable logic/implementation).

At block 610, a unified view of the current status and changed status of the process transaction at each stage on a digital dashboard is displayed (As shown in the FIG). The digital dashboard also displays a traceability report based on a milestone achieved by the process transaction at each stage of the process lifecycle, and the generated KPIs report.

In an example embodiment, a task, step or milestone in the process map is drawn with red boundary if there are any transactions currently waiting or are in that respective task, step or milestone. Also, each task, step or milestone is overlaid with number of all transactions being processes by systems currently.

The second step of the process transaction at each stage of the process lifecycle is determined by. Further, in some embodiments, a text query box is also provided to query metadata dimension, wherein a control panel is used for setting a predefined similarity thresholds for metadata dimensions such as material, manufacturing, function, and shape similarities and combination thereof. In an example, the computed similarity values is in the form of a scalar value. In some embodiments, the similarity values may be pre computed based on one or more previously defined queries on the user devices and stored in the data repository.

The order in which the in which the method(s) are described is not intended to be construed as a limitation, and any number of the described method blocks can be combined in any order to implement the method 600, or an alternative method. Additionally, individual blocks may be deleted from the methods without departing from the spirit and scope of the subject matter described herein. Furthermore, the method 600 can be implemented in any suitable hardware, software, firmware, or combination thereof.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

In various embodiments of FIGS. 1-6, a method and system for processing at least one transaction at each step in a process lifecycle is disclosed. The system facilitates a unified screen showing flow of process transaction at various stages, and measurement of process efficiency in terms of TAT (Turn around Time) or cycle time. The system and method further facilitates an effective mechanism to measure and monitor the process efficiency and take corrective actions at right time.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

What we claim is:

1. A system comprising:
   at least one memory;
   at least one processor, the at least one memory coupled to the at least one processor, wherein the at least one processor is capable of executing programmed instructions stored in the at least one memory to:
   identify a current status of one or more process transactions at a first step from a plurality of steps of a process lifecycle based on a unique ID, wherein the unique ID is tagged to each of a process transaction from the one or more process transactions at the first step, and wherein the unique ID is tagged based on predefined steps of the process lifecycle;
   determine a change in the status of the one or more process transactions at the first step based a completion of a milestone of the one or more process transactions, wherein the completion of the milestone comprises progression of the one or more process transactions to a second step from the plurality of steps of the process lifecycle, wherein the progression of the one or more process transactions is identified by mapping the identified current status of the one or more process transactions at the first step to corresponding process attributes at a predefined condition;
   calculate one or more Key Performance Indicators (KPIs) information for the current status and the changed status of the one or more process transactions to generate an aggregated real-time tracking view of a KPIs report, wherein the aggregated view of the KPIs report comprises measuring a success rate of the one or more transactions and updating the measure of the success rate for the one or more process transactions; and
   display an unified view comprising the current status and changed status of the one or more process transactions and a traceability report on a digital dashboard, the traceability report being generated based on the milestone completed by the one or more process transactions at the first step of the process lifecycle and the generated KPI report,
      wherein the unified view displays visibility into life-cycle of the one or more process transactions, wherein the visibility into life-cycle comprises determining number of transactions being processed in comparison to number of transactions being held and corresponding milestone associated with number of transactions to facilitate cause of delay and failure of the one or more transactions, and wherein the digital dashboard is in communication with the at least one processor.

2. The system as claimed in claim 1, wherein the change in the status of the one or more process transactions and a progress of one or more the process transactions at the first step is enabled in real-time as per an industry requirement.

3. The system as claimed in claim 1, wherein the completion of the milestone is measured based on predefined parameters, wherein the predefined parameters comprise at least one of date and time of the milestone achieved and time taken for completing the milestone.

4. The system as claimed in claim 3, wherein the completion of the milestone is represented by a visual indicator and the completion of the milestone is determined based on a corresponding Service Level Agreement (SLA) of the one or more process transactions at the first step in a process lifecycle.

5. The system as claimed in claim 1, wherein the digital dashboard is further configured to display process instance counts superimposed on the completed milestone of the one or more process transactions at the first step in the process lifecycle.

6. The system as claimed in claim 1, wherein the KPIs report further comprises of a measure in the change of the one or more process transactions attributes corresponding to the one or more process transaction at one or more steps in the process lifecycle.

7. The system as claimed in claim 1, wherein the at least one processor is further configured by the instructions to generate notifications for the competition of the milestone of the one or more process transactions at scheduled frequency.

8. The system as claimed in claim 1, wherein the traceability report comprises process history of the one or more process transactions at one or more steps in the process lifecycle.

9. A processor implemented method, the method comprising:
   identifying a current status of one or more process transactions at a first step from a plurality of steps of a process lifecycle based on a unique ID, wherein the unique ID is tagged to each of a process transaction from the one or more process transactions at the first step, and wherein the unique ID is tagged based on predefined steps of the process lifecycle;
   determining a change in the status of the one or more process transactions at the first step based a completion of a milestone of the one or more process transactions, wherein the completion of the milestone comprises progression of the one or more process transactions to a second step from the plurality of steps of the process lifecycle, wherein the progression of the one or more process transactions is identified by mapping the identified current status of the one or more process transactions at the first step to corresponding process attributes at a predefined condition;
   calculating one or more Key Performance Indicators (KPIs) information for the current status and the changed status of the one or more process transactions to generate an aggregated real-time tracking view of a KPIs report, wherein the aggregated view of the KPIs report comprises measuring a success rate of the one or more transactions and updating the measure of the success rate for the one or more process transactions; and
   displaying an unified view comprising the current status and changed status of the one or more process transactions and a traceability report on a digital dashboard, the traceability report being generated based on the milestone completed by the one or more process transactions at the first step of the process lifecycle and the generated KPI report, wherein the unified view displays visibility into life-cycle of the one or more process transactions, wherein the visibility into life-cycle comprises determining number of transactions being processed in comparison to number of transactions being held and corresponding milestone associated with number of transactions to facilitate cause of delay and failure of the one or more transactions.

10. The method as claimed in claim 9, further comprises generating notifications for the competition of the milestone of the one or more process transactions at scheduled frequency.

11. The method as claimed in claim 9, wherein the completed milestone is measured based on predefined parameters, wherein the predefined parameters comprise at least one of date and time of the milestone achieved and time taken for completing the milestone.

12. The method as claimed in claim 9, wherein the completion of the milestone is represented by a visual indicator and the completion of the milestone is determined based on a corresponding Service Level Agreement (SLA) of the one or more process transactions at the first step in the process lifecycle.

13. The method as claimed in claim 9, further comprises displaying process instance counts superimposed on the completed milestone of the one or more process transactions at the first step in the process lifecycle.

14. The method as claimed in claim 9, further comprises measuring a change of process transaction attributes corresponding to the one or more process transactions at one or more steps in the process lifecycle.

15. The method as claimed in claim 9, further comprises of tracking process history of the one or more process transactions at one or more steps in the process lifecycle.

16. A non-transitory computer-readable medium having embodied thereon a computer program, the method comprising
   identifying a current status of one or more process transactions at a first step from a plurality of steps of a process lifecycle based on a unique ID, wherein the unique ID is tagged to each of a process transaction from the one or more process transactions at the first step, and wherein the unique ID is tagged based on predefined steps of the process lifecycle;
   determining a change in the status of the one or more process transactions at the first step based a completion of a milestone of the one or more process transactions, wherein the completion of the milestone comprises progression of the one or more process transactions to a second step from the plurality of steps of the process lifecycle, wherein the progression of the one or more process transactions is identified by mapping the identified current status of the one or more process transactions at the first step to corresponding process attributes at a predefined condition;
   one or more Key Performance Indicators (KPIs) information for the current status and the changed status of the one or more process transactions to generate an aggregated real-time tracking view of a KPIs report, wherein the aggregated view of the KPIs report comprises measuring a success rate of the one or more transactions and updating the measure of the success rate for the one or more process transactions; and
   displaying an unified view comprising the current status and changed status of the one or more process transactions and a traceability report on a digital dashboard, the traceability report being generated based on the milestone completed by the one or more process transactions at the first step of the process lifecycle and the generated KPI report, wherein the unified view displays visibility into life-cycle of the one or more process transactions, wherein the visibility into life-cycle comprises determining number of transactions being processed in comparison to number of transactions being held and corresponding milestone associated with number of transactions to facilitate cause of delay and failure of the one or more transactions.

* * * * *